April 23, 1940.    S. PALKIN    2,198,175
MULTIPLE FILTER DEVICE
Filed July 11, 1939    2 Sheets-Sheet 1
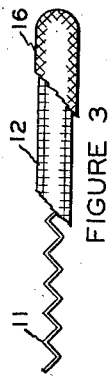
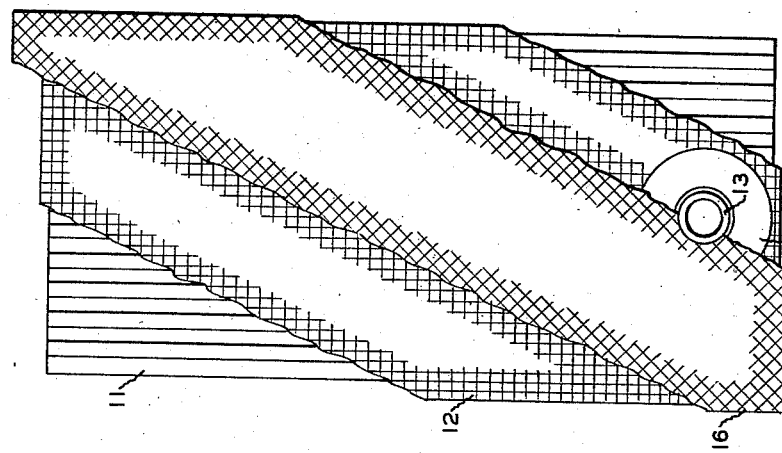
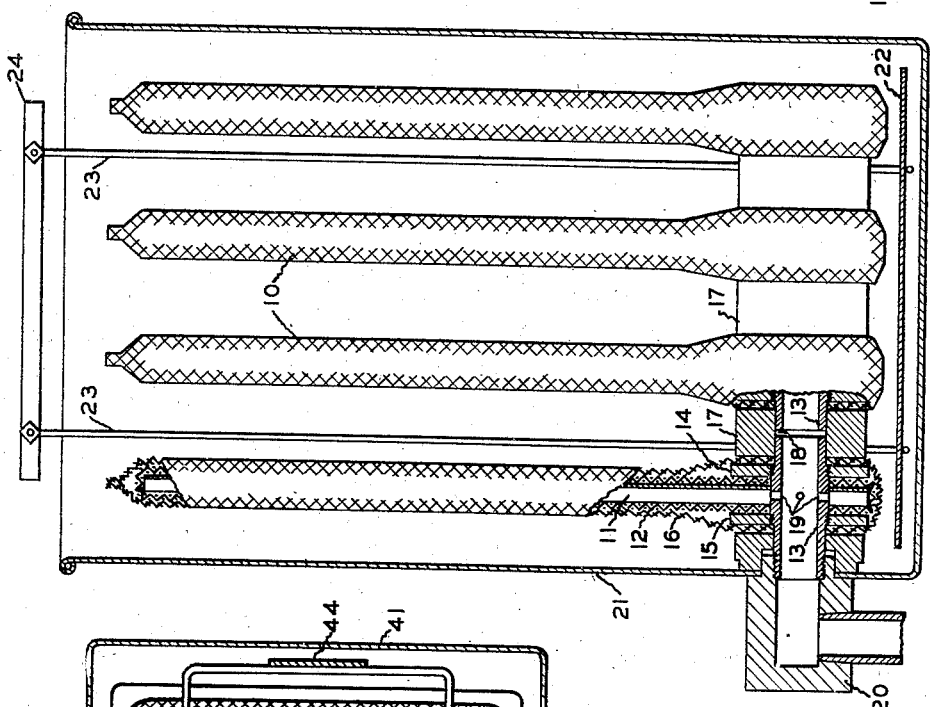
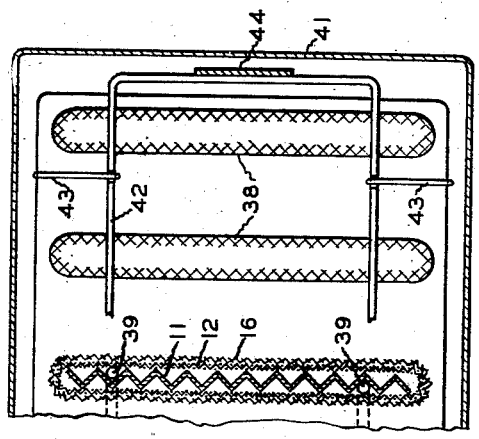
INVENTOR
SAMUEL PALKIN
BY
ATTORNEYS April 23, 1940.            S. PALKIN                 2,198,175
                        MULTIPLE FILTER DEVICE
                        Filed July 11, 1939          2 Sheets-Sheet 2
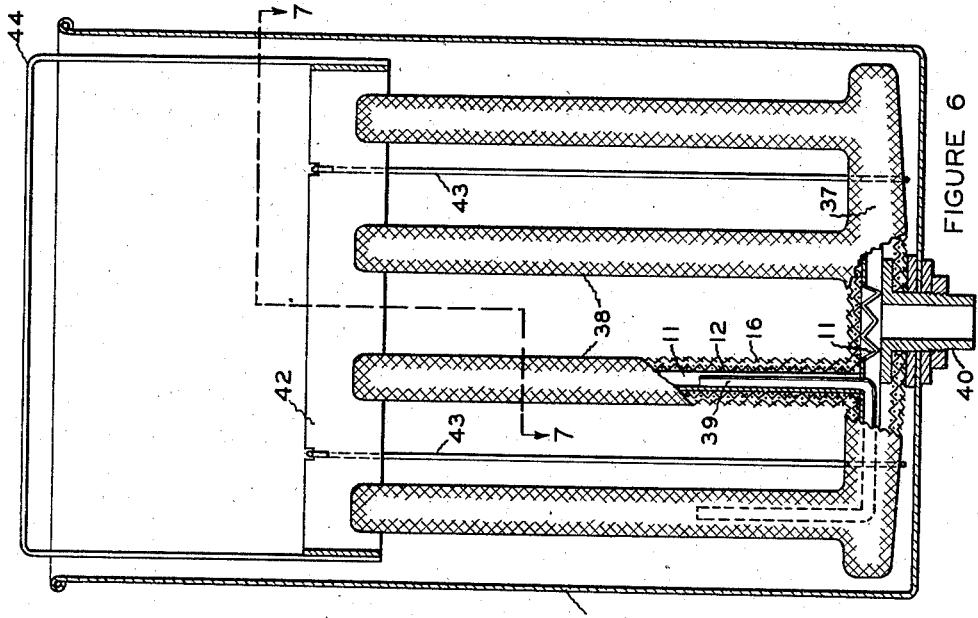
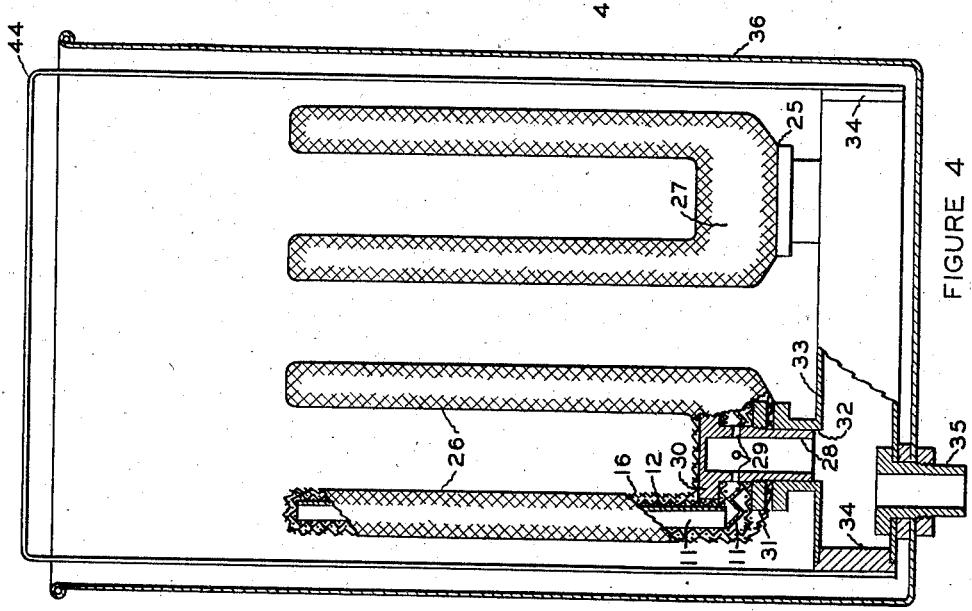
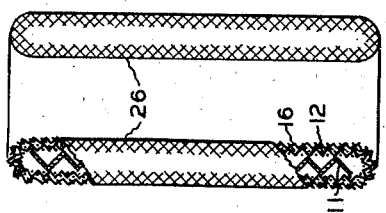
INVENTOR
SAMUEL PALKIN
BY
ATTORNEYS Patented Apr. 23, 1940

2,198,175

UNITED STATES PATENT OFFICE 2,198,175

MULTIPLE FILTER DEVICE

Samuel Palkin, Washington, D. C., dedicated to the free use of the People in the territory of the United States Application July 11, 1939, Serial No. 283,781

6 Claims. (Cl. 210—153)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to devices for filtering and is especially useful in filtering viscous materials, such as oleoresin where the filtering speed is slow.

One of the objects of this invention is the provision of a device which can be used as an integral part of a storage system, whereby filtering can be carried out during the storage of the material. While ordinarily it is desired to complete a filtering process as quickly as possible, in some cases, such as in the case of oleoresin, above mentioned, the filtration process per unit area is necessarily slow. Accordingly, to avoid loss of time, this invention may be employed to carry out a slow filtration process while the material to be filtered is stored in tanks, or other suitable receptacles.

Another object of this invention is the provision of a filtering device in which the residue is formed on the outer surface with a uniform thickness and in such a manner that when materials such as oleoresins consisting of suspensions of crystalline and other solid matter in a viscous liquid are filtered, the cake residue, after filtration, will be of a uniform dryness.

Another object of this invention is the provision of a filtering device which can be used either for simple gravity filtration or for suction filtration, and the change from gravity to suction filtration can be accomplished without disturbing the assembly.

In the description hereinafter given, three forms of my invention are illustrated and described. All three of these embodiments can be used for the purposes and with the advantages above set forth.

In the accompanying drawings which illustrate the three embodiments of my invention:

Figure 1 is a vertical section through a storage tank in which the first embodiment of my invention is disposed and shown partly in section.

Figure 2 is a fragmentary view of one of the filtering elements of Figure 1, with portions broken away to show the construction.

Figure 3 is a plan view of Figure 2.

Figure 4 is a front elevational view, partly in section, of the second embodiment of my invention disposed in a storage tank.

Figure 5 is a plan view, partly in section, of one of the filtering elements of the embodiment shown in Figure 4.

Figure 6 shows the third embodiment of my invention disposed in a storage tank, the view being in elevation and partly in section.

Figure 7 is a plan section along the line 7—7 of Figure 6.

Referring with more particularity to Figures 1, 2, and 3, the first embodiment of my invention comprises a plurality of upright filter leaf units 10. Each of these units is made up of a plate 11, which is corrugated in a vertical direction. This corrugated plate constitutes the core of the leaf, and is covered with a screen 12 of suitable mesh. The corrugations of the plate 11 keep the sides of the screen 12 sufficiently separated. Each one of these leaves is provided with a stub pipe 13, held in place by suitable flanges 14 and 15, one on each side of the unit. The entire leaf is then covered with a suitable filter cloth 16, openings being provided in the cloth on both sides for the stub pipe 13. These leaves are assembled by means of spacers 17, said spacers having a central bore 18 within which the stub pipes 13 fit sufficiently tight to prevent undue leakage. Each of the stub pipes 13 is provided with apertures 19 through its wall communicating with the space between the filter cloth 16 of its corresponding leaf. The leaf on one extreme end has the outer end of its stub pipe sealed. The leaf on the other end communicates with an exterior draining system through a removable pipe fitting 20. This pipe fitting, when in place, secures the entire device to the bottom of the tank 21, and, when removed, permits the entire apparatus to be lifted out. The lifting out of the apparatus and the setting of it in place may be accomplished by means of any desired lifting device, such as a horizontal shelf 22 attached to vertical straps 23 depending from a handle bar 24.

In this embodiment, it will be observed, that as many filter leaves may be employed as desired by simply inserting or removing additional leaves together with corresponding spacers 17. Consequently, this device is extremely flexible in use and can be used for any desired size or shape of storage tank. In the actual operation of this device, the liquid placed in the tank may filter by gravity and the filtrate enters through the interstices of the filter cloth 16, thence through the screen 12 into the space between the sides of said screen where the corrugated plate 11 is disposed. On striking this plate, the filtrate runs down toward the bottom along the vertical corrugations, entering the stub pipes 13 through the apertures 19, and thence passing out of the tank through the pipe connection 20. If it is desired to use the device in vacuum filtration, the fitting 20 is connected to a suitable source of vacuum which, acting through apertures 19, draws the filtrate through the filter units.

Referring now with more particularity to Figures 4 and 5, which illustrate the second embodiment of this invention, the principle is practically the same except that a slightly modified arrangement is employed. In this embodiment instead of employing the single vertical filter leaf units, each unit 25 is U-shaped, substantially as shown, the vertical arm 26 of each unit having substantially the same construction as the filter leaves in the embodiment first described. The horizontal base 27 of each filter unit also has the same construction, and has a vertical tube 28 connected thereto. Apertures 29 in the tube 28 communicate with the space between the filter cloths, substantially the same as the apertures 19 in the previously described embodiment. The tube 28 is sealed at its upper end and is held in place by means of flanges 30 and 31. The lower portion of each tube 28 is adapted to register with a flange opening 32, each unit being supported by the flange thereof, the opening communicating with a horizontal outlet tube 33. The ends of the tube 33 have removable ends 34 which are normally in place, but which may be removed for the purpose of cleaning. The tube 33 is connected to a pipe fitting 35 through the bottom (or side, if desired) of the storage tank 36, through which the filtrate flows and which may be connected to a suitable vacuum system in the same manner as the embodiment above described. In this embodiment, filter units can be added only by utilizing a larger pipe 33, having the required number of apertures for accommodating the tubes 28 of the filter units. However, this embodiment has the advantage in that any unit may be temporarily removed, cleaned, and replaced without affecting the other filter units. Also a complete change of filter units may be made in a comparatively short time.

The embodiment shown in Figures 6 and 7 comprises a horizontal leaf 37 and a plurality of vertical leaves 38, removably attached to the horizontal leaf. All of these leaves are constructed in the same manner as the filter leaves described in the two embodiments above mentioned. In this embodiment, however, the horizontal leaf serves two purposes. It acts both as a filtering unit and to replace the horizontal tube 33, thus simplifying construction. The vertical leaves 38 are removably disposed on the horizontal leaf 37 by any suitable means. The means shown in the drawings consist of U-pins 39 projecting through the upper wall, adapted to slidably engage the vertical filter leaves. In this embodiment, it is preferable to have the filter cloth placed over the assembled leaves rather than over individual leaves before assembling. In other words, the filter cloth is only placed over the effective filter surfaces. In this manner the spaces between the filter cloths are mutually communicating. Through the bottom of the horizontal filter leaf an outlet pipe 40 is secured to which the filtrate passes from all of the leaves. This outlet tube 40 registers with, and is sealed in, a suitable aperture in the bottom of the storage tank 41, substantially as shown. The assembled leaves are held together in spaced relation by means of a notched header 42 disposed on the vertical leaves, substantially as shown, which is held in place by means of straps 43, of wire or any other suitable material. A lifting device 44, attached to the header 42, may be employed for placing the apparatus in the storage tank and removing it therefrom.

Having thus described my invention, I claim:

1. A filter apparatus comprising a plurality of filter leaves in spaced relation, each leaf comprising a corrugated plate core, a screen encasing said core, a filter cloth encasing said screen, a stub pipe through each of said leaves, said pipe having apertures through its wall communicating with the space in the core of its respective leaf, tubular spacers connecting the stub pipes of said leaves in series, and a central outlet for the assembled series.

2. A filter apparatus comprising a plurality of filter leaves in spaced relation, each leaf comprising a corrugated plate core, a screen encasing said core, a filter cloth encasing said screen, a stub pipe through each of said leaves, said pipe having apertures through its wall communicating with the space in the core of its respective leaf, tubular spacers removably connecting the stub pipes of said leaves in series, and a central outlet for the assembled series.

3. A filter apparatus comprising a plurality of U-shaped filter leaves, said leaves comprising corrugated plate cores, screen casings for said cores, filter cloths encasing said screen casings, a vertical stub pipe through the base of each of said leaves, said stub pipe having apertures through its wall communicating with the space in the core of its respective leaf, a horizontal tube, said tube having a plurality of spaced vertical apertures therethrough engaged with the said stub pipes, one pipe for each aperture, and a central outlet in said horizontal tube.

4. A filter apparatus comprising a plurality of U-shaped filter leaves, said leaves comprising corrugated plate cores, screen casings for said cores, filter cloths encasing said screen casings, a vertical stub pipe through the base of each of said leaves, said stub pipe having apertures through its wall communicating with the space in the core of its respective leaf, a horizontal tube, said tube having a plurality of spaced vertical apertures therethrough removably engaged with the said stub pipes, one pipe for each aperture, and a central outlet in said horizontal tube.

5. A filter apparatus comprising a plurality of filter leaves, one of said leaves being horizontally disposed and the others being vertically disposed thereon in spaced relation, each of said leaves comprising a corrugated plate core, a screen encasing said core, a filter cloth encasing the effective filter surfaces of the assembled leaves, and a central outlet for the space in the cores of said leaves.

6. A filter apparatus comprising a plurality of filter leaves, one of said leaves being horizontally disposed and the others being vertically disposed thereon in spaced relation, means for removably supporting said vertical leaves on said horizontal leaf, each of said leaves comprising a corrugated plate core, a screen encasing said core, a filter cloth encasing the effective filter surfaces of the assembled leaves, and a central outlet for the space between that portion of the filter cloth about said horizontal leaf.

SAMUEL PALKIN.